United States Patent Office 3,769,426
Patented Oct. 30, 1973

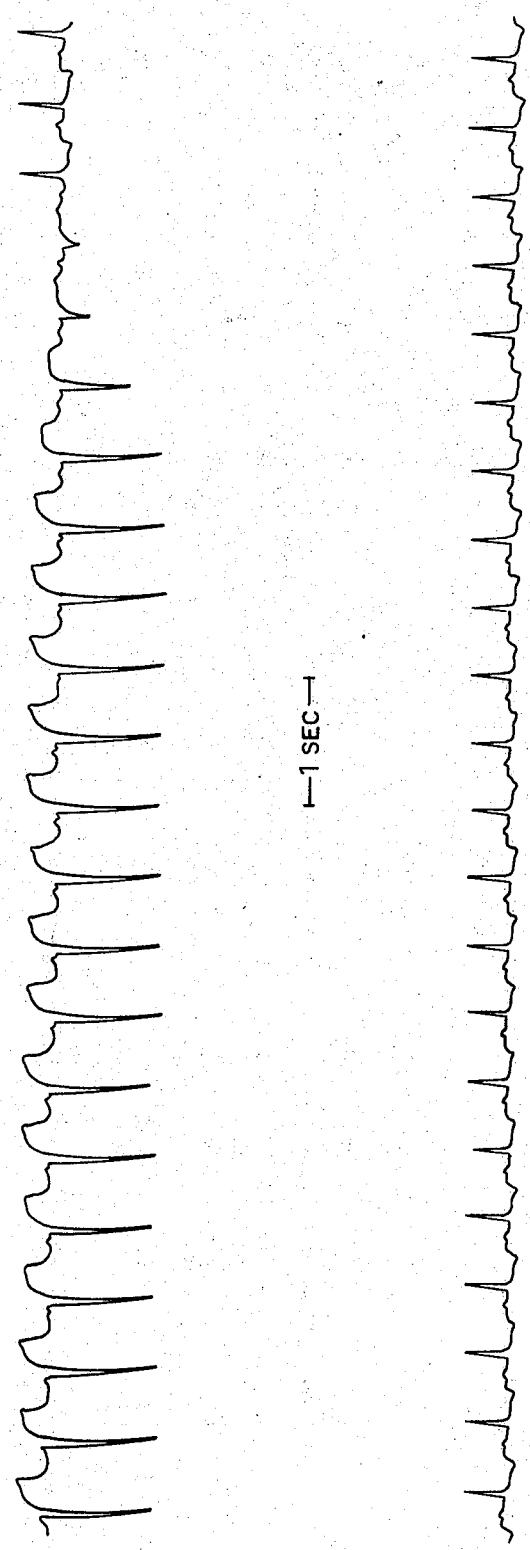

3,769,426
ANTI-ARRYTHMIC AGENT
Bryan B. Malloy and Ronald R. Tuttle, Indianapolis, Ind., assignors to Eli Lilly and Company, Indianapolis, Ind.
Filed July 3, 1972, Ser. No. 268,378
Int. Cl. A61k 27/00
U.S. Cl. 424—321     1 Claim

ABSTRACT OF THE DISCLOSURE 2-amino-4-phenylsulfonylbenzenesulfonamide counteracts cardiac arrythmias.

BACKGROUND OF THE INVENTION 2-amino-4-phenylsulfonylbenzenesulfonamide is known to protect mammals against convulsions induced by electroshock and is also a carbonic anhydrase inhibitor, according to Lund et al., Acta pharmacol. et Toxicol., 30, 17 (1971), Lassen et al., ibid., 1, and Lund et al., Clin. Pharm,. Ther., 12, 902 (1971). The compound is also described in foreign patents Fr. 1,593,110 and D.P.P. 1,085,778. Nothing in the published descriptions of the use of 2-amino-4-phenylsulfonylbenzenesulfonamide as an anticonvulsant or as a carbonic anhydrase inhibitor would indicate any therapeutic activity on the heart.

Dilantin, a marketed anti-convulsant, is known to have anti-arrythmic activity. On the other hand, phenobarbital, the most widely used anti-convulsant, has no such activity.

DESCRIPTION OF THE INVENTION

This invention provides a method of establishing normal cardiac rhythm in a mammal having cardiac arrythmias caused by increased ventricular automaticity which comprises administering to said mammal by the oral route from 1 to 200 mg. per kg. of animal body weight of 2-amino-4-phenylsulfonylbenzenesulfonamide which has the following structure:

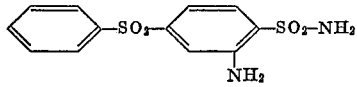

The action of 2-amino-4-phenylsulfonylbenzenesulfonamide in counteracting cardiac arrythmias is demonstrated by the following experiment. A female dog is anesthetized with pentobarbital-sodium at the dose of 35 mg./kg. and maintained on positive pressure respiration. The femoral arterial pressure and the Lead II electrocardiogram are continuously recorded. Ouabain injected at the rate of 85 mcg./kg. is given intravenously to the anesthetized dog over a ten minute period. Ten minutes after the completion of the injection, severe ventricular arrythmias appear. After the arrythmias have persisted for thirty minutes, oral administration of 2-amino-4-phenylsulfonylbenzenesulfonamide is initiated. Progressively higher dosages are given starting with 2 mg./kg. and continuing with 4, 8, 15, 30, and 60 mg./kg. After a cumulative dose of 90 mg./kg. has been given, the arrythmias convert to normal sinus rhythm, as set forth in the figure. The figure shows the Lead II electrocardiogram (ECG) for a female dog treated as outlined above. The abnormal rhythm is present starting at the left side of the upper tracing and continues almost to the end of the panel, showing a ventricular tachycardia typical of that caused by ouabain. The last three beats on the upper tracing show the start of conversion to normal sinus rhythm after the injection of 2-amino-4-phenylsulfonylbenzenesulfonamide and the lower panel shows a continuation of this normal rhythm.

In other experiments, a single injection of 51 mg./kg. in a dog prepared as above of 2-amino-4-phenylsulfonylbenzenesulfonamide antagonized ouabain-induced arrythmias and converted the arrythmias to sinus rhythm. In two other dogs similarly prepared, a dose of 70 mg./kg. substantially improved the rhythm but did not produce normal sinus rhythm. In the above experiments, the arrythmias returned within three minutes after the injection had been terminated, as expected.

2-amino-4-phenylsulfonylbenzenesulfonamide counteracts arrythmias specifically attributed to increased ventricular automaticity induced by the sympathetic hormone, isoproterenol, aconitine, halothane - sensitization, myocardial infarction, and digitalis intoxicant, which term includes ouabain-induced arrythmias. The dose level of the drug as utilized in the process of this invention will vary from 1 to 200 mg./kg. of mammalian body weight per arrythmic attack. The drug is administered as an anti-arrythmic drug in the same forms and by the same mode as has previously been used for administration for anti-convulsant purposes. Tablets formulated with the usual excipients or capsules both administered orally are preferred.

We claim:
1. The process of establishing normal cardiac rhythm in a mammal suffering from arrythmias caused by an increase in ventricular automaticity which comprises administering to said mammal by the oral route from 1 to 200 mg./kg. of 2-amino-4-phenylsulfonylbenzenesulfonamide.

References Cited
UNITED STATES PATENTS
3,558,699  1/1971  Christensen et al. ____ 424—321
3,580,949  5/1971  Gruenman et al. _____ 424—321

SAM ROSEN, Primary Examiner

UNITED STATES PATENT AND TRADEMARK OFFICE
CERTIFICATE OF CORRECTION

PATENT NO. : 3,769,426
DATED : October 30, 1973
INVENTOR(S) : Bryan B. Malloy and Ronald R. Tuttle It is certified that error appears in the above-identified patent and that said Letters Patent are hereby corrected as shown below:

Column 1, lines 22-23, "D.P.P. 1,085,778." should read --D.B.P. 1,805,778.--.

Column 2, line 29, "intoxicant" should read "intoxication--.

Signed and Sealed this eighth Day of June 1976

[SEAL]

Attest:

RUTH C. MASON
Attesting Officer

C. MARSHALL DANN
Commissioner of Patents and Trademarks